United States Patent
Frisken et al.

(10) Patent No.: US 6,836,562 B2
(45) Date of Patent: Dec. 28, 2004

(54) METHOD FOR DETERMINING THE SHAPE OF OBJECTS DIRECTLY FROM RANGE IMAGES

(75) Inventors: Sarah F. Frisken, Cambridge, MA (US); Ronald N. Perry, Cambridge, MA (US)

(73) Assignee: Mitsubishi Electric Research Laboratories, Inc.

( * ) Notice: Subject to any disclaimer, the term of this patent is extended or adjusted under 35 U.S.C. 154(b) by 726 days.

(21) Appl. No.: 09/829,187

(22) Filed: Apr. 9, 2001

(65) Prior Publication Data

US 2002/0146163 A1 Oct. 10, 2002

(51) Int. Cl.⁷ .......................... G06K 9/00; G06T 15/00
(52) U.S. Cl. .................. 382/154; 382/285; 345/419; 356/12
(58) Field of Search .................. 382/154, 285, 382/203; 345/419–427; 356/12–14; 348/42–60; 359/462–477; 352/57–65; 33/20.4; 353/7–9; 378/41–42; 396/324–331

(56) References Cited

U.S. PATENT DOCUMENTS

| | | | | |
|---|---|---|---|---|
| 5,224,208 A | * | 6/1993 | Miller et al. | 345/609 |
| 5,548,694 A | * | 8/1996 | Frisken Gibson | 345/424 |
| 5,867,592 A | * | 2/1999 | Sasada et al. | 382/154 |
| 6,184,887 B1 | * | 2/2001 | Rohner | 345/419 |
| 6,262,738 B1 | * | 7/2001 | Gibson et al. | 345/419 |
| 6,396,492 B1 | * | 5/2002 | Frisken et al. | 345/420 |
| 6,469,700 B1 | * | 10/2002 | Munshi et al. | 345/419 |
| 6,724,393 B2 | * | 4/2004 | Perry et al. | 345/581 |
| 2002/0130854 A1 | * | 9/2002 | Perry et al. | 345/420 |
| 2002/0130856 A1 | * | 9/2002 | Perry et al. | 345/420 |
| 2002/0130858 A1 | * | 9/2002 | Perry et al. | 345/420 |
| 2002/0130859 A1 | * | 9/2002 | Perry et al. | 345/420 |

OTHER PUBLICATIONS

Curless et al. "A Volumetric Method for Building Complex Models from Range Images", In Proceedings of SIGGRAPH '96, pp. 303–312, 1996.
Wheeler et al. "Consensus Surfaces for Modeling 3D Objects from Multiple Range Images".

* cited by examiner

*Primary Examiner*—Yon J. Couso
*Assistant Examiner*—Aaron Carter
(74) *Attorney, Agent, or Firm*—Dirk Brinkman; Andrew J. Curtin

(57) ABSTRACT

A method is described for determining a 2D gradient magnitude image from a range image of an object. The range image includes intensity values at pixel locations. The intensity values correspond to distances to a surface of the object. For each pixel (i,j) in the range image, a horizontal central difference dx value and a vertical central difference dy value are determined. Then, the 2D gradient magnitude image value at each pixel (i,j) is set to $0.5*\mathrm{sqrt}(dx^2+dy^2+4)$. The range image can be scaled so that a unit intensity value at each pixel corresponds to a unit distance value. The magnitude of a gradient at a 3D point p can then be determined from the scaled range image and the gradient magnitude image. First, a perpendicular projection (x,y) of p onto the scaled range image is computed. Next, a gradient magnitude at (x,y) is interpolated from the corresponding values of the 2D gradient magnitude image near the location (x,y). Finally, the magnitude of the gradient at p is set to the interpolated gradient magnitude at (x,y).

2 Claims, 1 Drawing Sheet

METHOD FOR DETERMINING THE SHAPE OF OBJECTS DIRECTLY FROM RANGE IMAGES

FIELD OF THE INVENTION

The present invention relates generally to the field of computer graphics, and particularly to generating models of graphics objects from range images.

BACKGROUND OF THE INVENTION

Several techniques have been developed in research and industry for determining 3D geometry from a set of aligned range images, see Curlass "*From range scans to 3D models*," Comp. Graphics, Vol. 33, No. 4, 1999.

Recent work has shown that volumetric methods are robust to scanner noise and alignment uncertainty and provide good quality, water-tight models, see Curlass et al. "*A volumetric method for building complex models from range images*," Proc. SIGGRAPH'96, pp. 303–312, 1996, Hilton et al. "*Reliable surface reconstruction from multiple range images*," 4th Euro. Conf. Comp. Vis., pp. 117–126, 1996, and Wheeler "*Automatic modeling and localization for object recognition*", Ph.D. Thesis, Carnegie Mellon University, 1996.

However, most of these methods suffer from limited resolution, large memory requirements and long processing time. In addition, these methods produce mesh models with an excessively large number of triangle.

These methods construct a range surface for each aligned range image, and fill a fixed resolution volumetric representation with signed distances from the range surfaces. The methods use various techniques to reduce the time required to fill and access the volumetric data, including run length encoding of the distance values, binary encoding of regions outside a bounded region of the surface, and a 3-color octree representation of the volume. The distance values from multiple scans can be combined probabilistically using order-independent, or incremental updating. These methods all build a triangle model of the iso-surface of the distance volume using a well known Marching Cubes technique, see Lorensen et al. in "*Marching Cubes: A High Resolution 3D Surface Construction Algorithm*," Proc. SIGGRAPH '87, pp. 163–169, 1987.

Constructing 3D range surfaces and computing distances from these iso-surfaces significantly increases computational requirements. If, instead, the distance field could be generated directly from 2D range images, model generation times could be greatly reduced.

However, range images do not provide true distance values. In the simplest case, a range image records the perpendicular projected distance from the object's surface to the image plane. The projected distance field is the same as the true distance field in only two special cases: throughout the distance field for a planar surface exactly parallel to the image plane, and at the surface where both true distances and the projected distances are zero for any surface.

Other than the first case, the projected distance field differs from the true distance field for points off the surface. This results in artifacts when projected distance fields from different viewpoints are combined.

Prior art described in U.S. patent application Ser. No. 09/206,071 "*A Method for Estimating Volumetric Distance Maps from 2D Depth Images*" filed by Frisken et al. on Dec. 4, 1999 showed that a 3D projected distance field can be corrected by dividing sampled distances by the magnitude of the local 3D gradient of the projected distance field. This results in a better approximation of the true distance field near the surface, yielding better results when combining projected distance fields. However, computing the 3D gradient of the projected distance field directly from sampled distance values can be prohibitively expensive since it can require six or more additional evaluations of the distance field per gradient.

Therefore, it is desired to determine corrective distance field gradients directly from range images rather than from 3D volumetric data.

SUMMARY OF THE INVENTION

The present invention provides a method for determining a 2D gradient magnitude image from a range image of an object from which the 3D gradient magnitude can be derived. The range image includes a plurality of intensity values at pixel locations. The intensity values correspond to distances to a surface of the object.

The method scales the range image so that a unit intensity value corresponds to a unit distance value. Then, for each pixel $s_{i,j}$ in the range image, the method determines a horizontal central difference dx, and a vertical central difference dy. Then, the 2D gradient magnitude at each pixel $s_{i,j}$ is set to one half of the square root of $(dx^2+dy^2+4)$.

The magnitude of the gradient of a 3D projected distance field can then be determined at a 3D point p by perpendicularly projecting the point p onto a location (x, y) of the scaled range image, by interpolating the gradient magnitude at (x,y) from the corresponding 2D gradient magnitude image values near the location (x,y), and by setting the 3D gradient magnitude at p to the interpolated 2D gradient magnitude at (x,y).

DETAILED DESCRIPTION OF THE PREFERRED EMBODIMENT

Introduction

Figure 1:
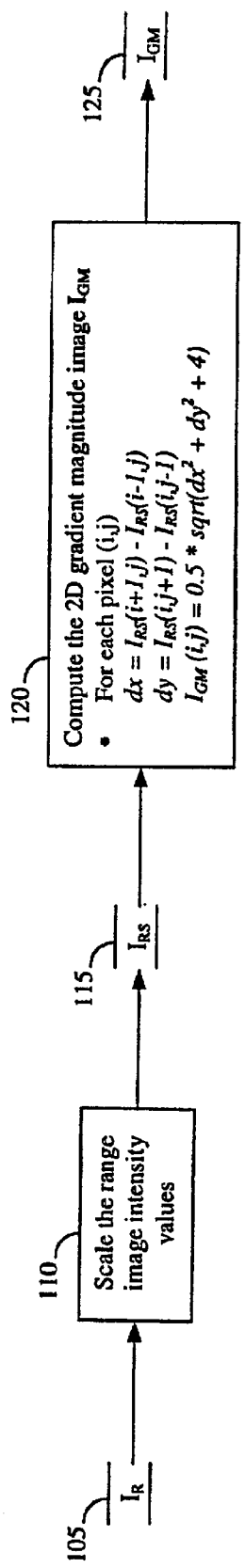
FIG. 1 is a block diagram of a method for determining a 2D gradient magnitude image according to the invention.

We describe a method for determining the magnitude of the 3D gradient of the projected distance field directly from 2D range images. Using our method, the 3D shape of an object can be derived directly from 2D range images rather than range surfaces as in the prior art. Furthermore, this method can be used to generate an adaptively sampled distance field (ADF) rather than a distance volume or a three-color octree, resulting in a significant savings in memory and distance computations.

We correct the 3D projected distance field by dividing sampled distances by the local gradient magnitude. This results in a better approximation of the true distance field near the surface, yielding better results when combining projected distance fields. We derive the 3D gradient from a 2D gradient image generated during a pre-processing step, resulting in significantly faster generation.

Because range images of some scanning systems are not simple projected distances, the range images must first be converted to this form. While this conversion results in some loss of information from the scan, the benefits include significantly faster performance, thus allowing interactive updating during data acquisition.

Adaptively Sampled Distance Fields

We prefer to use an adaptively sampled distance field (ADF) to represent the shape of an object. Here, the shape of objects is acquired by range images 105, see FIG. 1. The basic data structure of an ADF is described in U.S. patent application Ser. No. 09/370,091 "*Detail-Directed Distance Fields*" filed by Frisken et al. on Aug. 6, 1999, incorporated herein in its entirety by reference.

ADFs adaptively sample a signed distance field of an object and store the sample values in a spatial hierarchy for fast processing. Distance values with a positive sign are exterior to the object, negative distance values are interior, and zero distance values represent the surface of the object.

Methods that can operate on ADFs are described in: U.S. patent applications Ser. No. 09/810,983 "*System and Method for Generating Adaptively Sampled Distance Fields with Bounded Distance Trees*" filed by Perry et al. on Mar. 16, 2001, U.S. patent application Ser. No. 09/810,839 "*Conversion of Adaptively Sampled Distance Fields to Triangles*" filed by Frisken et al. on Mar. 16, 2001, U.S. patent application Ser. No. 09/811,010 "*System and Method for Modeling Graphics Objects*" filed by Perry et. al. on Mar. 16, 2001, and U.S. patent application Ser. No. 09/809,682 "*System and Method for Converting Range Data to 3D Models*," filed by Frisken et al. on Mar. 16, 2001.

Frisken et al., in "*Adaptively sampled distance fields: a general representation of shape for computer graphics*," Proc. SIGGRAPH'00, pp. 249–254, 2000, found that even in 2D, ADFs require twenty times fewer distance computations than a comparable three color octree representation such as is used by Wheeler, in "*Automatic modeling and localization for object recognition*", Ph.D. Thesis, Carnegie Mellon University, 1996. In addition, ADFs can be interactively edited via a sculpting interface so that holes and other surface anomalies from occlusions and sensor noise can be easily corrected, see Perry et al. "*Kizamu: A system for sculpting digital characters*," Proc. SIGGRAPH'01, 2001, and U.S. patent application Ser. No. 09/810,261 "*System and Method for Sculpting Digital Models*" filed by Perry et al. on Mar. 16, 2001.

2D Gradient Magnitude Images from Range Images

FIG. 1 shows a method for determining a 2D gradient magnitude image $I_{GM}$ 125 from a range image $I_R$ 105. In step 110, the intensity value at each pixel of the range image 105 is scaled to produce a scaled range image $I_{RS}$ 115. The scaling ensures that a normalized unit intensity value at each pixel represents a unit distance value.

Step 120 determines the gradient magnitude image 125 from the scaled range image 115.

For each pixel (i,j), we determine central difference values:

$$dx = I_{RS}(i+1, j) - I_{RS}(i-1, j)$$

$$dy = I_{RS}(i, j+1) - I_{RS}(i, j-1)$$

and the 2D gradient magnitude image value at (i,j):

$$I_{GM}(i,j) = 0.5 * sqrt(dx^2 + dy^2 + 4).$$

Magnitude of Gradients in a 3D Projected Distance Field

Figure 2:
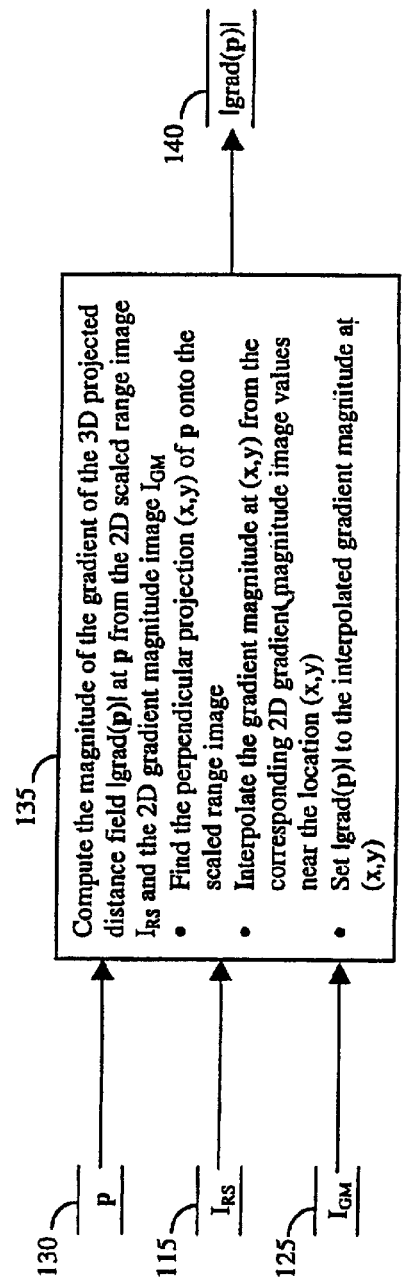
FIG. 2 is a block diagram of a method for determining the magnitude of the gradient of a 3D projected distance field.

FIG. 2 shows a method for determining a magnitude of a gradient 140 at a 3D point p 130 from the scaled range image 115 and the gradient magnitude image 125. First, a perpendicular projection (x,y) of p 130 onto the scaled range image 115 is determined. Next, a gradient magnitude at (x,y) is interpolated from the corresponding values of the 2D gradient magnitude image 125 near the location (x,y). Any known prior art interpolation method, such as bilinear interpolation, can be used. Finally, the magnitude of the gradient 140 at p 130 is set to the interpolated gradient magnitude at (x,y).

This invention is described using specific terms and examples. It is to be understood that various other adaptations and modifications may be made within the spirit and scope of the invention. Therefore, it is the object of the appended claims to cover all such variations and modifications as come within the true spirit and scope of the invention.

We claim:

1. A method for determining a gradient magnitude image from a range image, the range image including a plurality of intensity values at pixel locations, comprising:

determining, for each pixel (i,j), a horizontal central difference dx, and a vertical central difference dy;

setting a 2D gradient magnitude at each pixel (i,j) in a gradient magnitude image $I_{GM}$ to $0.5*sqrt(dx^2+dy^2+4)$;

scaling the range image to produce a scaled range image where a unit intensity value at each pixel corresponds to a unit distance value;

selecting a 3D point p; and further comprising:

determining a magnitude of a gradient at point p from the scaled range image and the gradient magnitude image $I_{GM}$ comprising:

perpendicularly projecting point p onto the scaled range image to determine a location (x,y);

interpolating a gradient magnitude at the location (x,y) from the corresponding 2D gradient magnitude image values near the location (x,y); and setting the magnitude of the gradient at point p to the interpolated gradient magnitude at location (x,y).

2. A method for determining a gradient magnitude image from a range image, the range image including a plurality of intensity values at pixel locations, comprising:

determining, for each pixel (i,j), a horizontal central difference dx, and a vertical central difference dy;

setting a 2D gradient magnitude at each pixel (i,j) in a gradient magnitude image $I_{GM}$ to $0.5*sqrt(dx^2+dy^2+4)$;

scaling the range image to produce a scaled range image where a unit intensity value at each pixel corresponds to a unit distance value; and further comprising:

determining a projected distance at point p from the scaled range image;

determining a magnitude of a gradient at p from the scaled range image and the gradient magnitude image $I_{GM}$ comprising:

perpendicularly projecting point p onto the scaled range image to determine a location (x,y);

interpolating a gradient magnitude at the location (x,y) from the corresponding 2D gradient magnitude image values near the location (x,y); and setting the magnitude of the gradient at the point p to the interpolated gradient magnitude at the location (x,y); and setting the corrected projected distance at point p to the projected distance at point p divided by the magnitude of the gradient at point p.

* * * * *